United States Patent [19]

Kitagishi et al.

[11] Patent Number: 4,508,433
[45] Date of Patent: Apr. 2, 1985

[54] TELEPHOTO OBJECTIVE

[75] Inventors: Nozomu Kitagishi; Sadahiko Tsuji, both of Kanagawa, Japan

[73] Assignee: Canon Kabushiki Kaisha, Tokyo, Japan

[21] Appl. No.: 489,393

[22] Filed: May 2, 1983

Related U.S. Application Data

[63] Continuation of Ser. No. 139,764, Apr. 14, 1980, abandoned.

[30] Foreign Application Priority Data

Apr. 20, 1979 [JP] Japan ............................... 54-48658

[51] Int. Cl.³ .................. G02B 13/02; G02B 9/62; G02B 9/64
[52] U.S. Cl. .................................................. 350/454
[58] Field of Search ............... 350/454, 455, 457, 450, 350/456

[56] References Cited

U.S. PATENT DOCUMENTS

| | | | |
|---|---|---|---|
| 4,045,128 | 8/1977 | Momiyama | 350/455 X |
| 4,053,211 | 10/1977 | Momiyama | 350/255 |
| 4,113,357 | 9/1978 | Nakamura | 350/454 X |
| 4,176,913 | 12/1979 | Nakamura et al. | 350/455 |

*Primary Examiner*—John K. Corbin
*Assistant Examiner*—Scott J. Sugarman
*Attorney, Agent, or Firm*—Toren, McGeady and Stanger

[57] ABSTRACT

In a telephoto objective, a positive lens group and a negative lens group closer to the image than the positive lens group move simultaneously in axially opposite directions and relative to a stationary positive lens group which is closer to the image than both movable lens groups while the telephoto objective is being focused on an object. According to one embodiment of the invention, the diaphragm between the movable lens groups is varied in response to focusing so as to control the variation of the diameter of an on-axial light ray bundle.

13 Claims, 81 Drawing Figures

Y=10.9

Y=7.5

Y=5.4

Y=0

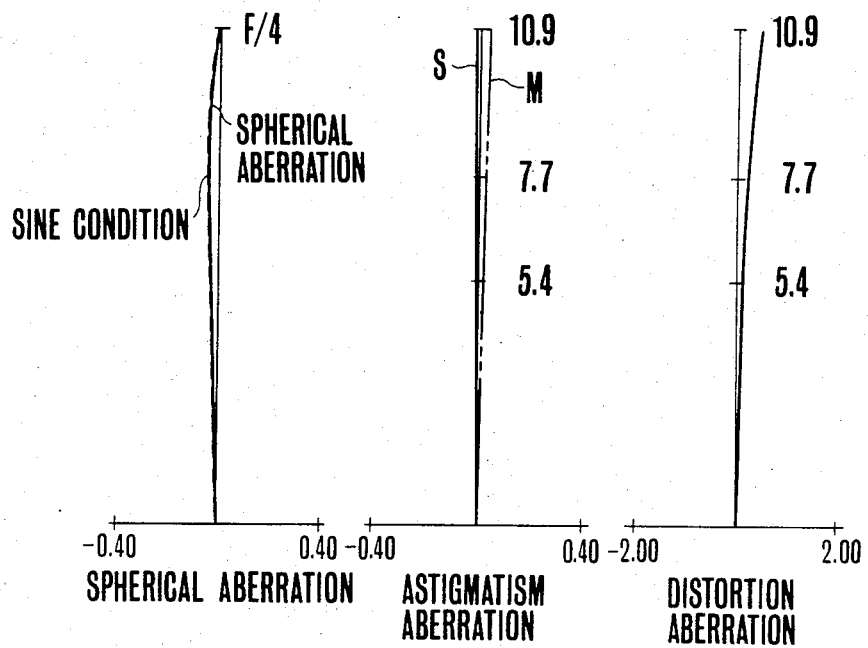
FIG.3A  FIG.3B  FIG.3C
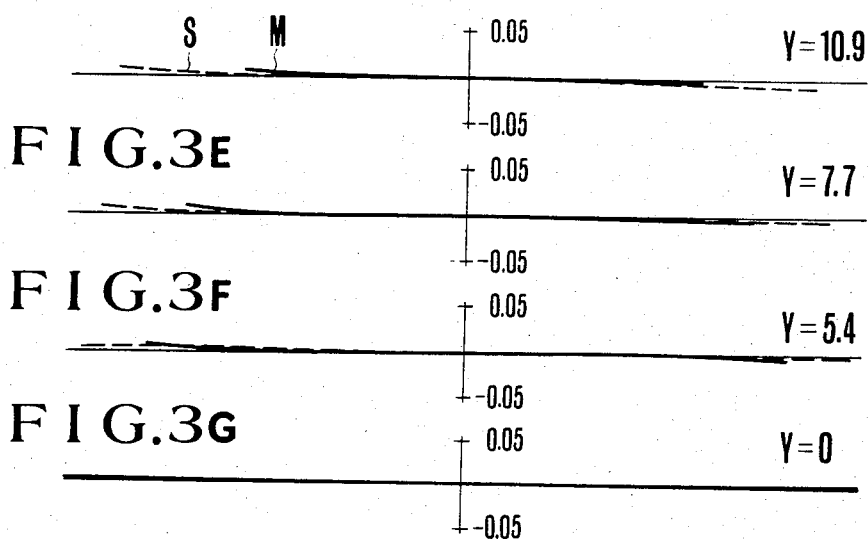
FIG.3D
FIG.3E
FIG.3F
FIG.3G

FIG.4A  FIG.4B  FIG.4C
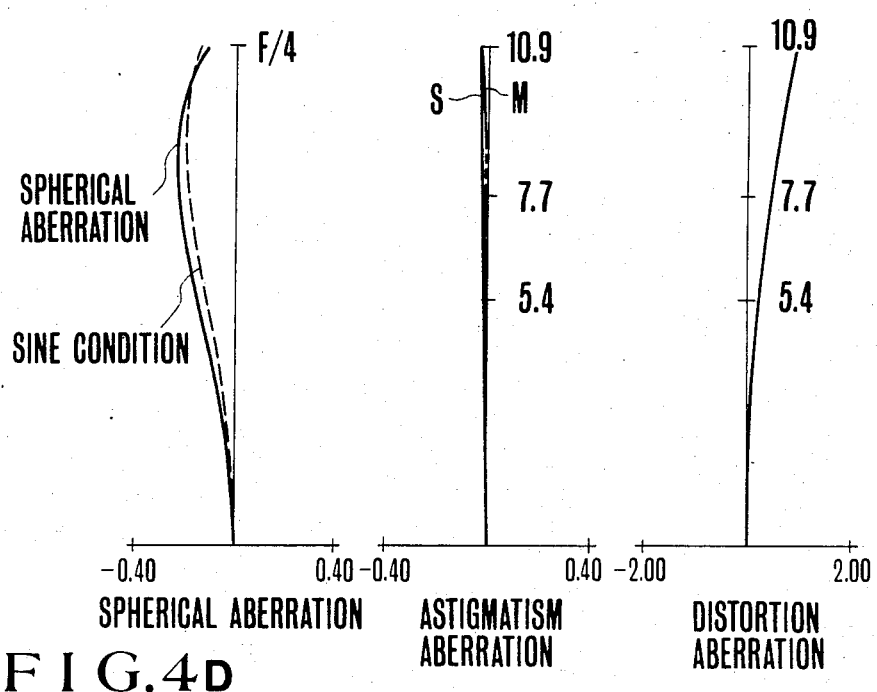
FIG.4D
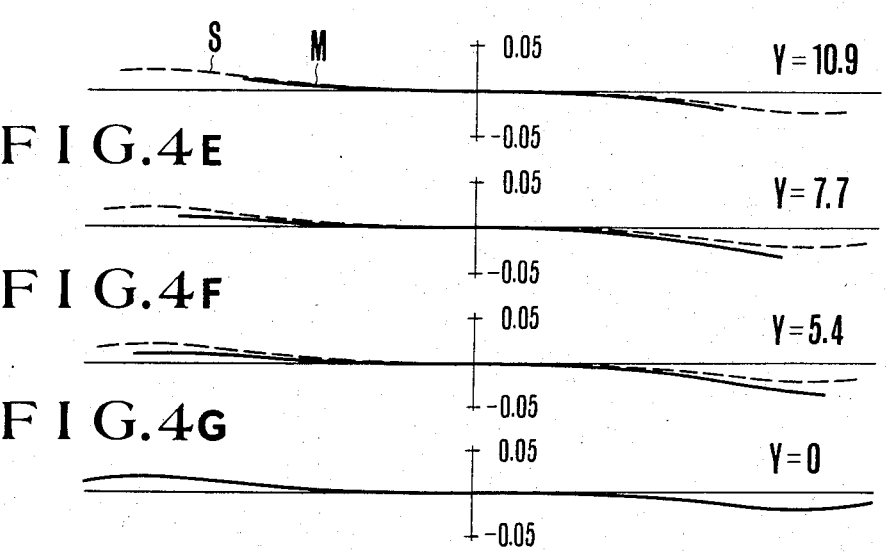
FIG.4E
FIG.4F
FIG.4G

FIG.5A  FIG.5B  FIG.5C
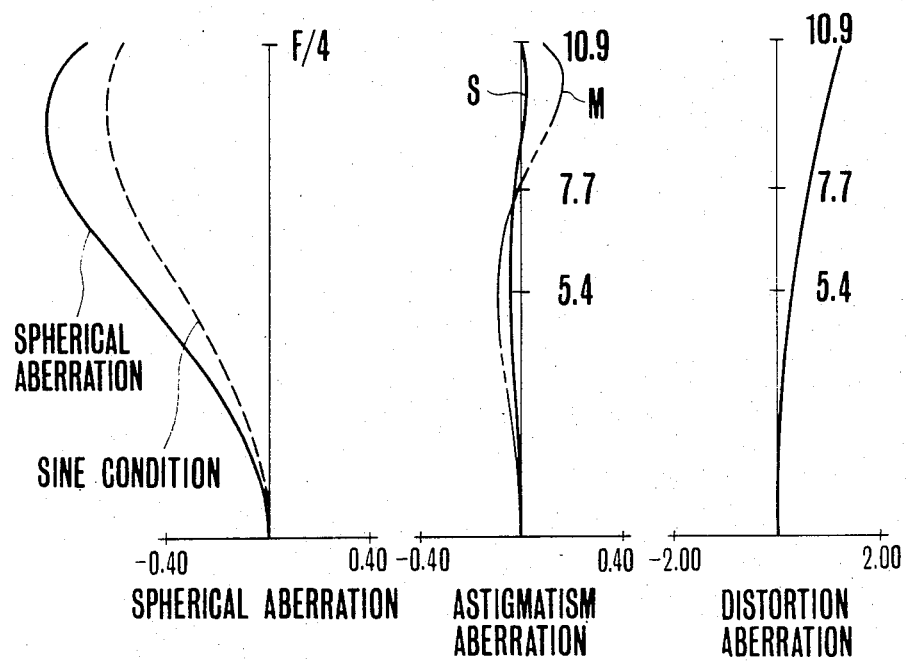
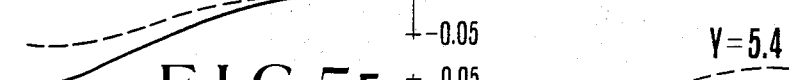
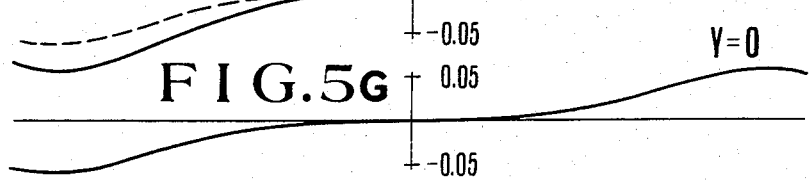

F I G. 6A
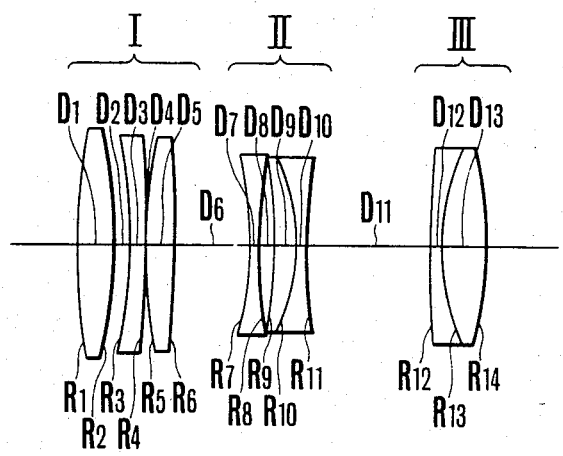
F I G. 6B
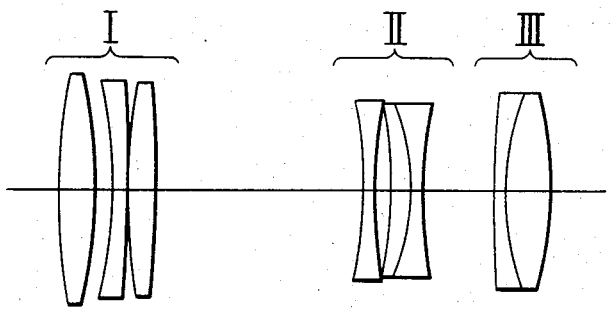

Y=10.8

Y=7.5

Y=5.0

Y=0

SPHERICAL ABERRATION   ASTIGMATISM ABERRATION   DISTORTION ABERRATION

Y=10.8

Y=7.5

Y=5.0

Y=0

FIG.9A  FIG.9B  FIG.9C
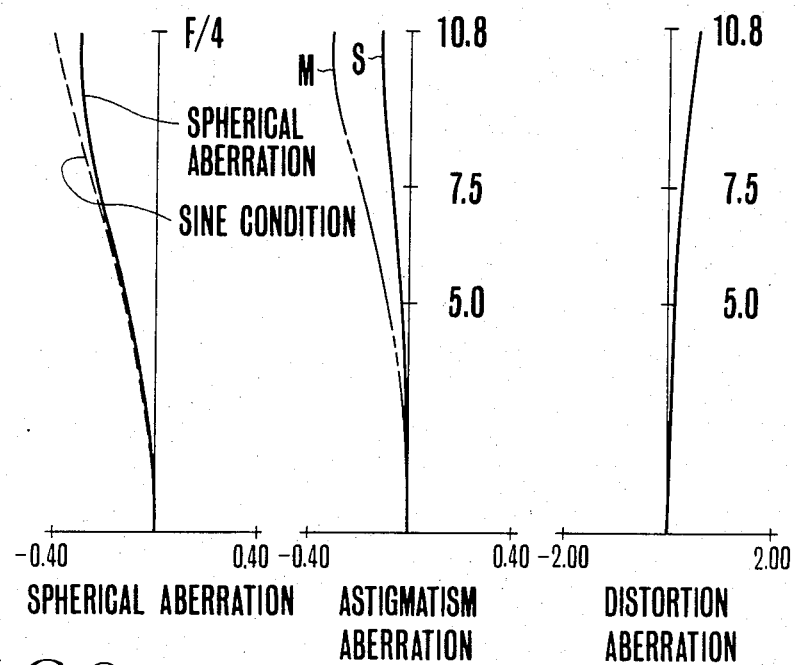
FIG.9D
FIG.9E
FIG.9F
FIG.9G
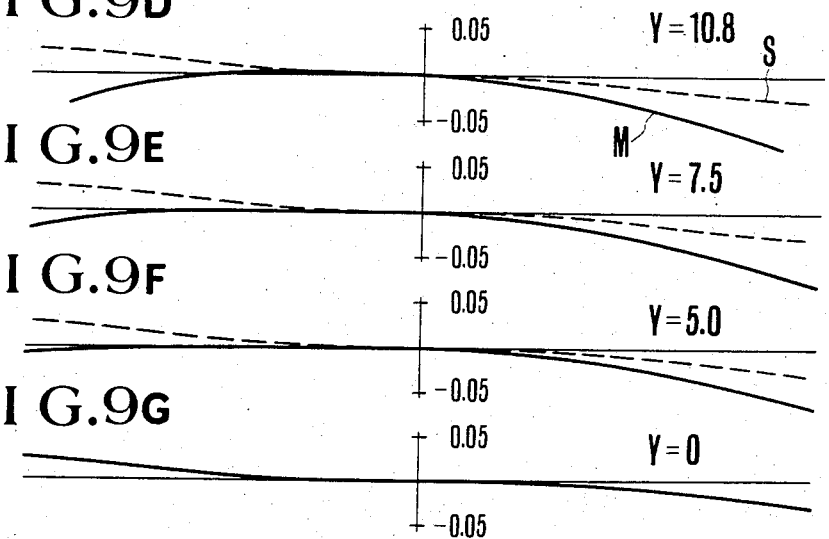

FIG.11A   FIG.11B   FIG.11C
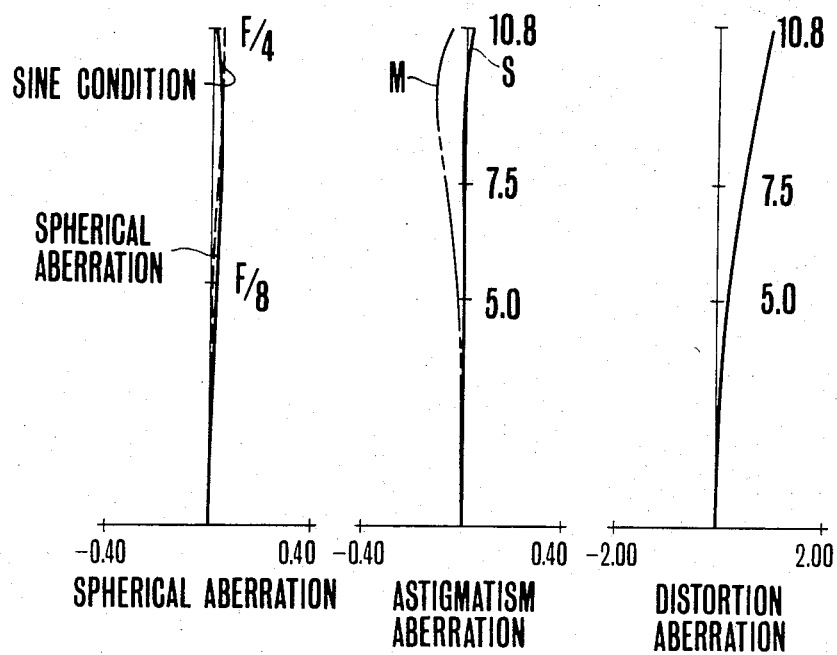
FIG.11D
FIG.11E
FIG.11F
FIG.11G
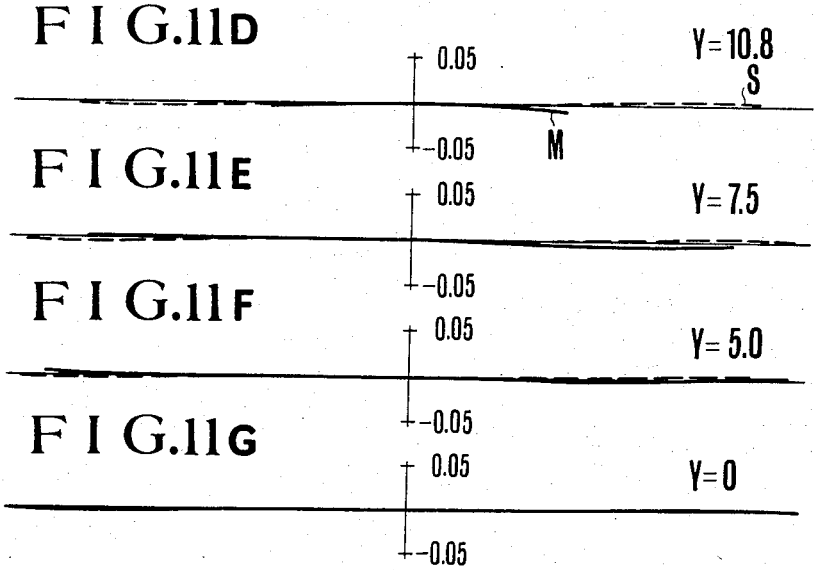

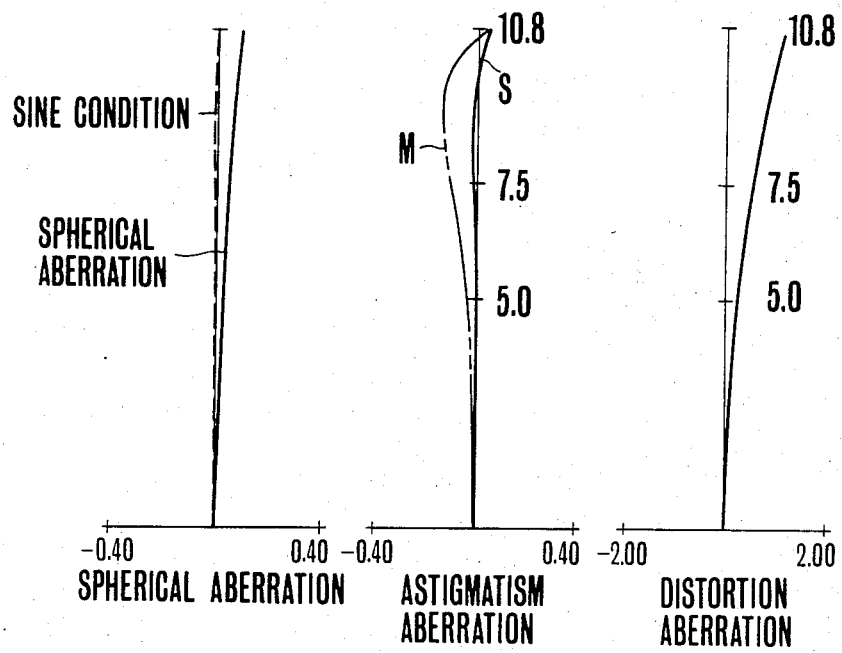

FIG.13A   FIG.13B   FIG.13C
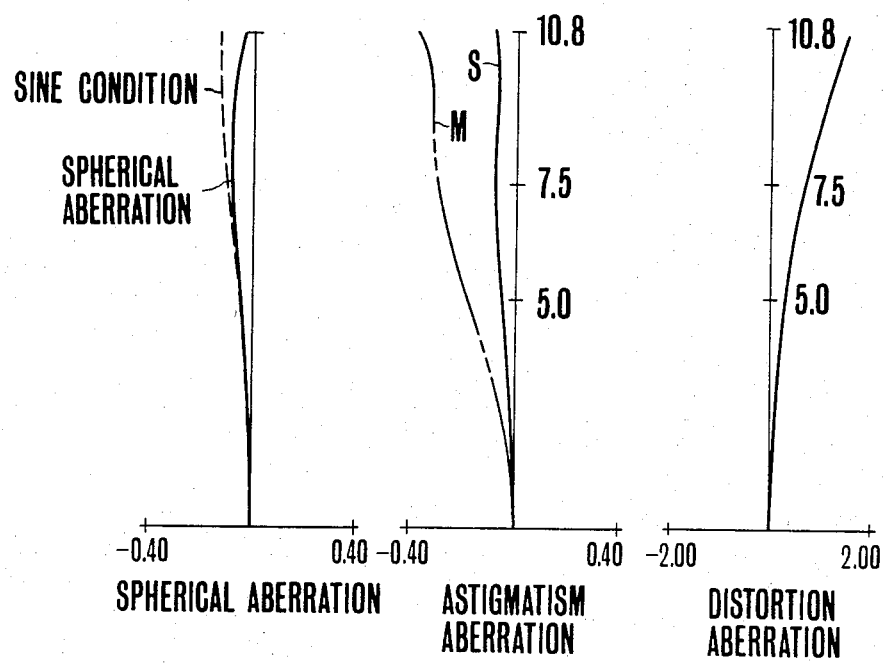
FIG.13D
FIG.13E
FIG.13F
FIG.13G
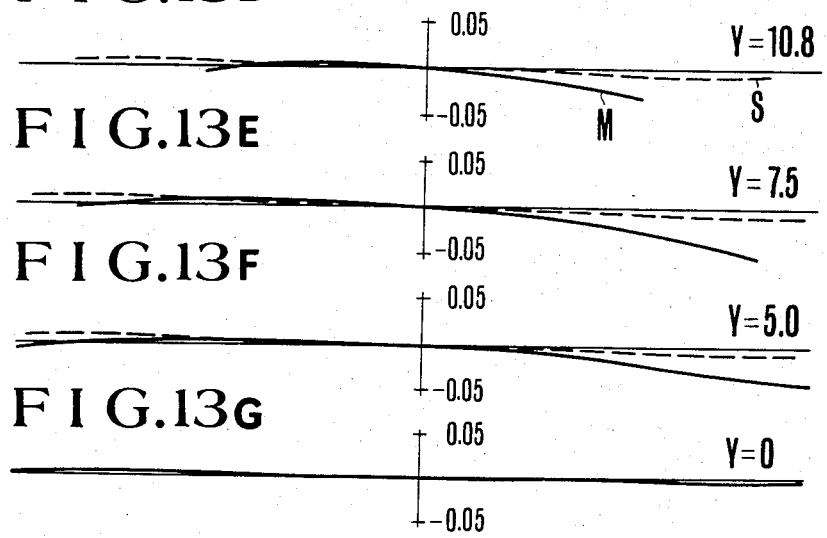

TELEPHOTO OBJECTIVE

This application is a continuation of application Ser. No. 139,764, filed Apr. 14, 1980, now abandoned.

BACKGROUND OF THE INVENTION

This invention relates to objectives for telephoto lenses and more particularly, to telephoto objectives suitable for close-up photography.

Most photographic objectives are focused by moving their constitutent components as a single unit. However, it is possible to focus an objective by moving either its front component or its rear component. With selective use of proper power distribution, moving the front component to focus offers the advantage of reducing the range of movement for the moving component from the range of movement required when the objective as a whole is moved. However, the front component itself must be properly corrected for aberrations. Otherwise, the overall aberrations would tend to vary substantially during focusing. On the other hand, focusing with the rear member has the advantage of taking place in a space where the height of incidence of on-axial rays is small and facilitates minimization of the weight of the movable focusing component. Moreover, focusing with the rear member prevents variation of the overall length of the objective during focusing and results in little shift of the center of gravity.

The telephoto objective of U.S. Pat. No. 4,045,128 is focused by moving a sub-group within the objective rear group. However, as this sub-group is axially moved to focus down on shorter object distances, the focal length of the entire optical system becomes shorter. For this reason, the image magnification at the same object distance is lowered as compared with the other focusing provision made at the entire system or the front member. It is known to provide a telephoto objective with its rear group having two sub-groups arranged to be axially moved in opposite direction to each other to effect focusing down, as disclosed in U.S. Pat. No. 3,854,797. It is also known to provide a telephoto objective in which either one of the front group or the front sub-group of the rear group is made movable for focusing as disclosed in U.S. Pat. No. 4,113,357. However, these conventional telephoto objectives when assessed from the point of view of a valuable increase in the image magnification, are incapable of satisfying a sufficient picture performance. If focusing is effected down to unduly short object distances, there will be a high possiblity of calling for a great increase in the range of movement of the focusing member, an objectionable lowering of the picture taking quality, or a large increase in the bulk and size of the entire lens system.

We see again that the optical system of the type capable of close-up photography is made axially movable usually as a whole toward the front to effect focusing. In this case, the amount of forward movement of the optical system is related to the image magnification by the following formula (1)

$$\beta = -x'/f \quad (1)$$

and the relationship between the image magnification and the object distance may be expressed by the following formula (2)

$$\hat{g}_1 = -(1 - 1/\beta)f \quad (2)$$

where
- $\beta$: the image magnification;
- $x'$: the amount of forward movement from the position for an infinitely distant object;
- $f$: the focal length of the entire optical system; and
- $\hat{g}_1$: the distance from the front principal plane of the optical system to an object being photographed.

Therefore, to achieve a desirable increase in the image magnification for the same amount of forward movement, the use of smaller values of f is advantageous. On the other hand, for the same image magnification, the object distance may become greater if f is increased. In practice, for example, when photographing a moving object such as an insect or where a great degree of freedom is needed in selecting the position of the main light source, the so-called working distance should be increased. With a 50 mm lens being used for taking a close-up photograph of $\beta = -0.5x$, the required values of forward movement and working distance are 25 mm and 150 mm respectively. With a 200 mm lens, they become 100 mm and 600 mm respectively. However, the increase in the working distance imposes the requirement of imparting a large amount of forward movement to the lens. This makes it necessary to elongate the axial length of the usual helicoid focus control, or to use long bellows. Moreover, as the image mangification is varied by readjusting the position of the lens, the resulting large amount of forward movement adversely affects the ease and speed of handling, and the way the camera is held must be adapted to cope with a large shift in the center of gravity.

SUMMARY OF THE INVENTION

A first object of the present invention is to achieve a valuable increase in the image magnification of a telephoto objective.

A second object is to shorten the minimum object distance.

A third object is to reduce the amounts of movement of two lens groups for focusing down to the shortest object distance.

A fourth object is to provide an image of an object at a short distance which is well corrected for spherical aberration and astigmatism.

A fifth object is to prevent lowering of the luminance at the marginal portions of the area of the picture frame and vignetting which would be otherwise resulted when the frontmost movable lens group is moved to the front.

A sixth object is to facilitate the increase of the image magnification by increasing the synthetic focal length of the entire system as two movable lens groups are moved from a position for an infinitely distant object to effect focusing down to shorter object distances.

A seventh object is to make easy and quick focus adjustment by lowering the sensitivity of a focusing control mechanism as when the lens system is focused on an object at infinity, from that occurring when focused on an object at shorter distances.

An eighth object is to regulate the effective on-axial pencil as its diameter varies with focusing.

BRIEF DESCRIPTION OF THE DRAWINGS

FIGS. 3A to 3G are graphic representations of the spherical aberration, sine condition, astigmatism, distortion, and lateral aberrations of the objective of FIG. 1 when focused for an image magnification of 0.1.

FIGS. 4A to 4G are graphic representations of the spherical aberration, sine condition, astigmatism, distortion and lateral aberrations of the objective of FIG. 1 when focused for an image magnification of 0.5.

FIGS. 5A to 5G are graphic representations of the spherical aberration, sine condition, astigmatism, distortion and lateral aberrations of the objective of FIG. 1 when focused for the magnification of unity.

FIG. 6A is a lens block diagram of a second embodiment of a telephoto objective according to the present invention when focused on an object at infinity.

FIG. 6B is a similar diagram of the objective when focused for an image magnification of 0.5.

FIGS. 9A to 9G are graphic representations of the spherical aberration, sine condition, astigmatism, distortion and lateral aberrations of the objective of FIG. 6 when focused for an image magnification of 0.5.

FIGS. 11A to 11G are graphic representations of the spherical aberration, sine condition, astigmatism, distortion and lateral aberrations of the objective of FIG. 10 when focused at infinity.

FIGS. 12A to 12G are graphic representations of the spherical aberration, sine condition, astigmatism, distortion and lateral aberrations of the objective of FIG. 10 when focused for an image magnification of 0.1.

FIGS. 13A to 13G are graphic representations of the spherical aberration, sine condition, astigmatism, distortion and lateral aberrations of the objective of FIG. 10 when focused for an image magnification of 0.5.

DESCRIPTION OF THE PREFERRED EMBODIMENTS

Figure 1A:
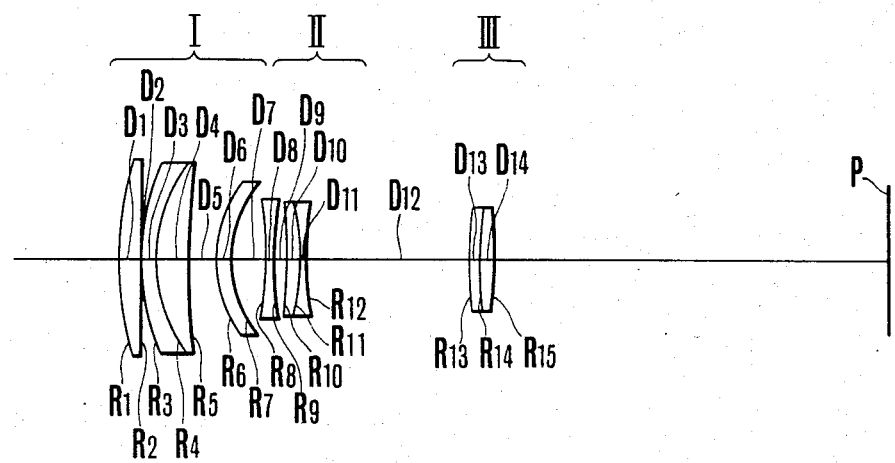
FIG. 1A is a lens block diagram of a first embodiment of a telephoto objective according to the present invention when focused on an infinitely distant object.
Figure 10A:
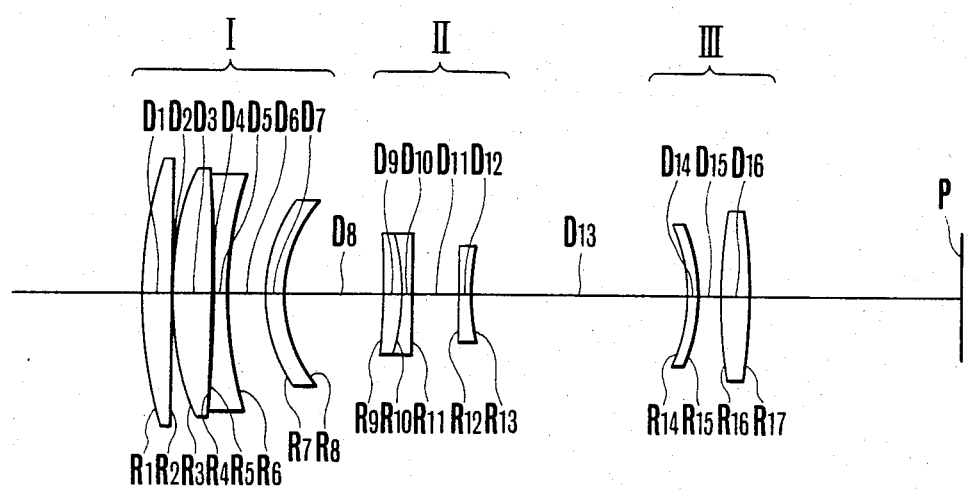
FIG. 10A is a lens block diagram of a third embodiment of a telephoto objective according to the present invention when focused on an object at infinity.

FIGS. 1A, 6A and 10A depict three different examples of telephoto objectives in a focusing position for an infinitely distant object. I is a first lens group having a positive refractive power and arranged on the object side to be axially movable for focusing; II is a second lens group having a negative refractive power and arranged in a middle position to be axially moved simultaneously with and in the opposite direction to the first lens group; and III is a stationary lens group having a positive refractive power and arranged on the image side. P indicates the surface of a photo-sensitive material. Again, a rearmost lens element in the movable first lens group I takes a meniscus form convex toward the front and plays a role in preventing the picture taking quality of the telephoto objective having a comparatively long focal length to be lowered during focusing.

Figure 1B:
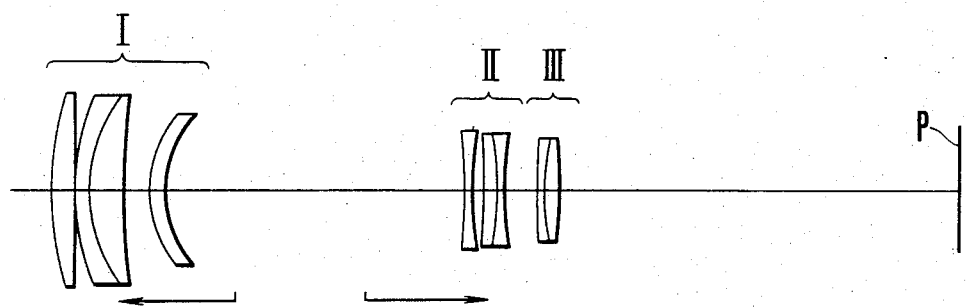
FIG. 1B is a similar view of the objective when focused for the unity of image magnification.
Figures 2A, 2B, 2C:
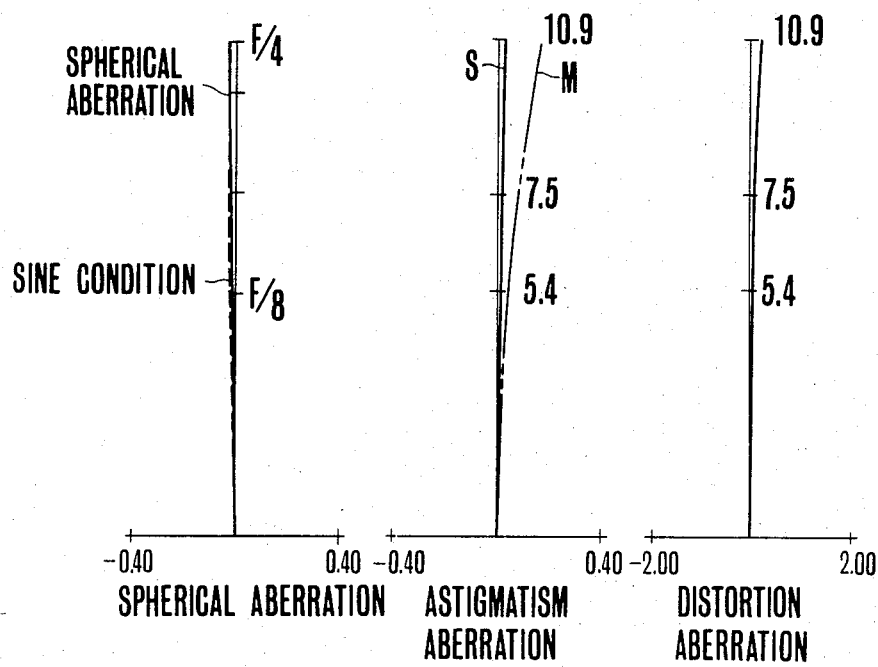
FIGS. 2A to 2G are graphic representations of the spherical aberration, sine condition, astigmatism, distortion and lateral aberrations of the objective of FIG. 1 when focused at infinity.
Figure 2D:
Figure 2E:
Figure 2F:
Figure 2G:
Figures 7A, 7B, 7C:
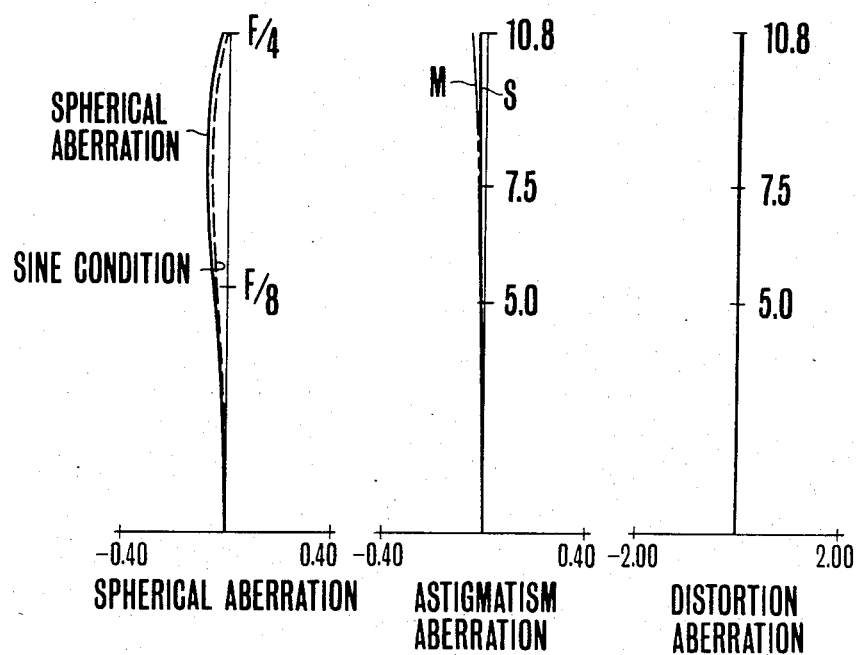
FIGS. 7A to 7G are graphic representations of the sherical aberration, sine condition, astigmatism, distortion and lateral aberrations of the objective of FIG. 6 when focused at infinity.
Figure 7D:
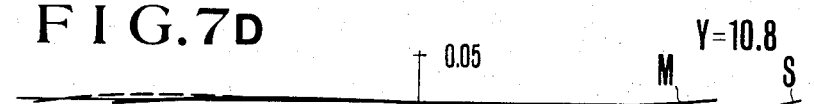
Figure 7E:
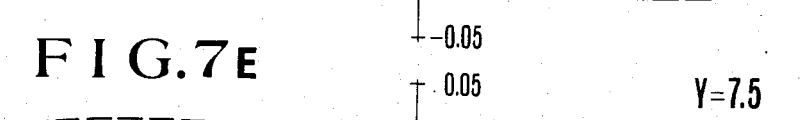
Figure 7F:
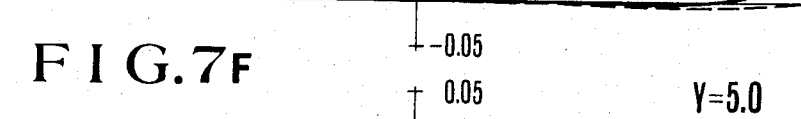
Figure 7G:
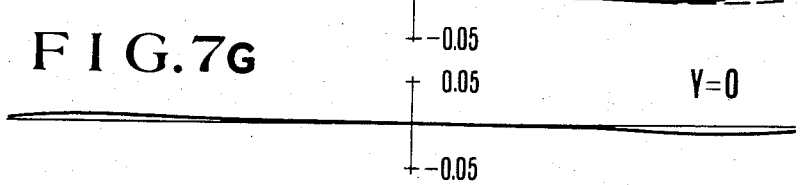
Figures 8A, 8B, 8C:
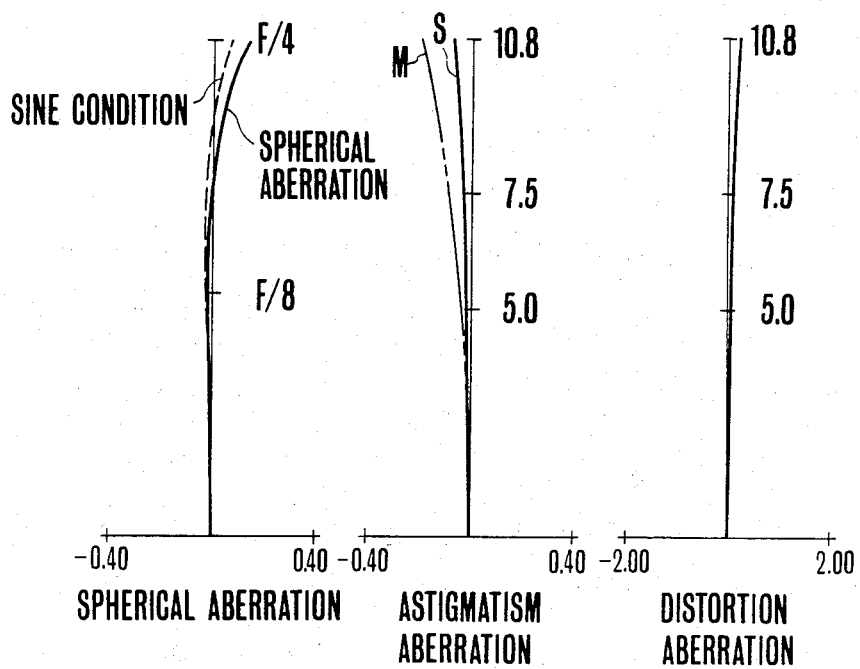
FIGS. 8A to 8G are graphic representations of the spherical aberration, sine condition, astigmatism, distortion and lateral aberrations of the objective of FIG. 6 when focused for an image magnification of 0.1.
Figure 8D:
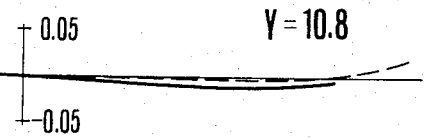
Figure 8E:
Figure 8F:
Figure 8G:
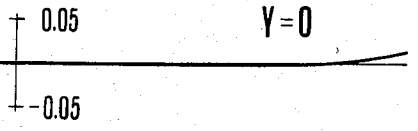
Figure 10B:
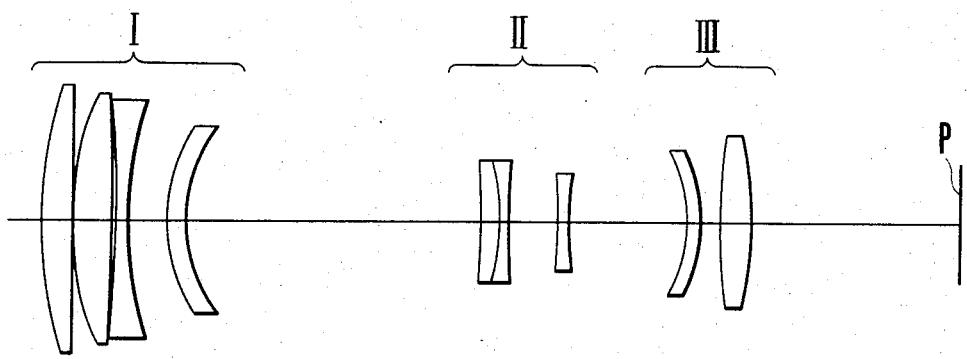
FIG. 10B is a similar diagram of the objective when focused for an image magnification of 0.5.

On the other hand, FIG. 1B depicts a lens position occurring when focusing is effected down to such an object distance that the image magnification is unity, and FIGS. 6B and 10B depict positions of the respective telephoto objectives where the image magnification is 0.5. As shown in each pair of figures, as the object distance is decreased, the first movable lens group I is moved to the front, while the second movable lens group II is moved to the rear. In this connection it should be noted that it is preferred to make negative the synthetic focal length of the second movable lens group II and stationary lens group III regardless of the movement of the second movable lens group II.

For a long lens covering a range of from an infinitely distant shot to a close-up shot, it is desired that the ratio of the amount of movement S1 of the first movable lens group I to the amount of movement S2 of the second movable lens group satisfies a condition of $0.7 < |S1|/|S2| < 1.4$, and that a power distribution suited for it is employed.

When the upper limit of this inequality is exceeded, the excess movement of the first movable lens group causes the spherical aberration and astigmatism to be varied to very large extent, and the image quality to be deteriorated when in close-up photography. Further when in close-up photography, as the distance from the diaphragm to the first movable lens group I is increased, there will be a high possibility of occurrence of a large loss of the brightness in the marginal portion of the picture frame and of a mutilation of the pencil which is to reach the corners of the picture frame. On the other hand, when the lower limit of the inequality is exceeded, the excess movement of the second movable lens group II causes the synthetic focal length of the lens to be shortened when in close-up photography so that this contradicts the need of facilitating the close-up photography.

In general, the amount of forward movement of the focusing member is almost proportional to the image magnification. With the objective covering an extended range of image magnifications from an infinitely small value to as large as 0.5 or unity, therefore, if the focusing control mechanism is so constructed that the ratio of the angle of rotation of the focus adjusting ring to the sum of the distances through which the two movable lens groups are displaced is maintained constant throughout the focusing range, the focusing control in the region of ordinary photography will become so far sensitive that upon slight rotation of the focus adjusting ring, the object distance to which focusing is effected is largely changed, thus fine adjustment of focusing is made very difficult to perform.

To compensate this drawback, the cam grooves controlling the movement of the two movable lens groups may be configured so that the amounts of movement of the first and second movable lens groups relative to the angle of rotation of the focus adjusting ring differ between when in ordinary photography and when in close-up photography.

Figure 14:
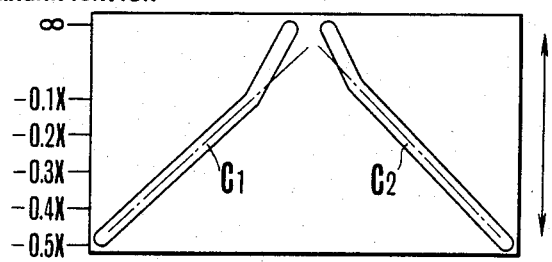
FIGS. 14 to 16 are plan views of cam sleeves for moving the lens groups in a telephoto objective embodying features of the invention.

FIG. 14 depicts a development surface of the cam sleeve for the telephoto objective capable of focusing with the variation of image magnification from an infinitely small value to 0.5. In the figure, C1 is a cam groove controlling the axial movement of the first movable lens group I, and C2 is a cam groove controlling the axial movement of the second movable lens group II. Engaged in these cam grooves C1 and C2 are cam pins (not shown) radially extending from respective movable lens cells. The cam grooves C1 and C2 each have two sections of different gradient so that when in ordinary photography with an object at infinity or down to a moderate distance, the amount of movement of each movable lens goup I, II to a certain angle of rotation of the cam sleeve becomes smaller, and when in focusing to shorter object distances, the relative amount of movement of the movable lens group becomes larger.

Figure 15:
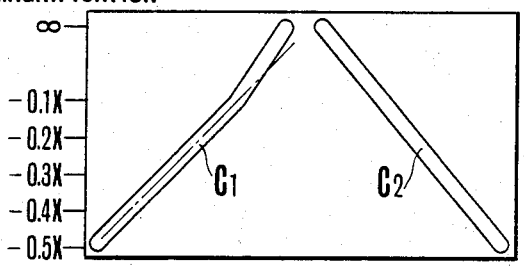
Figure 16:
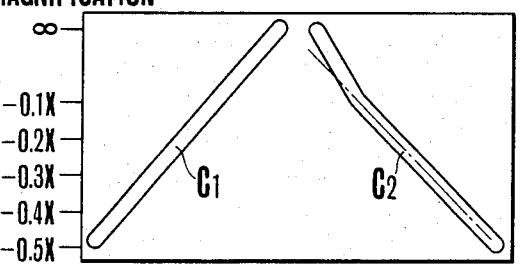

Although the cam sleeve of FIG. 14 changes the gradient of the both cam grooves, a telephoto objective having a comparatively short focal length may take a different form of the cam sleeve as shown in FIG. 15 or FIG. 16 where either one of the cam grooves C1 and C2 is made to vary the gradient in two sections so that the rate of cam lift is varied therebetween.

According to the foregoing description, the cam grooves and the cam pins are used in combination so as to move the two movable lens groups. However, one of the movable lens groups which does not change in the movement amount may be moved by the inner and outer helicoids. Also in the case where both of the two movable lens groups are not changed in their movement amounts both groups may be moved by a helicoid.

Figure 17:
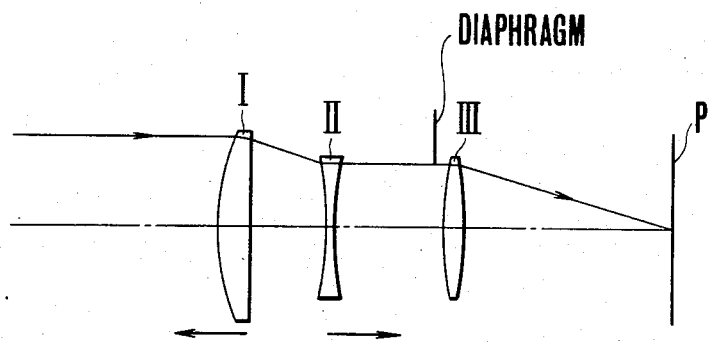
FIGS. 17 and 18 are lens diagrams illustrating the effect of the groups of lenses on pencil rays entering the lenses.
Figure 18:
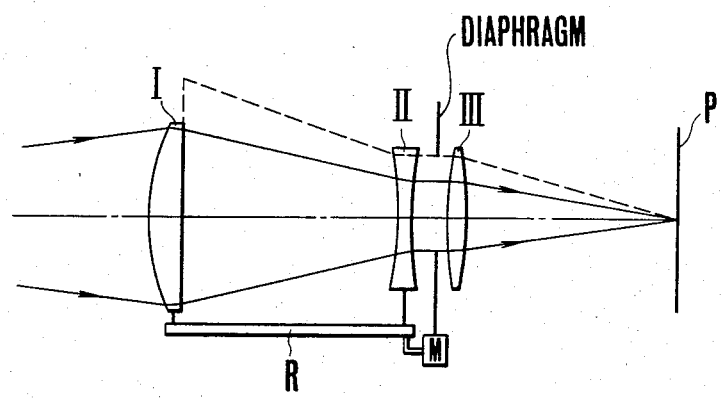

Another subject of the present invention is that the variation with focusing of the effective pencil is made to correlate with the variation of the diaphragm aperture. In this connection it should be explained that since the relative position of the diaphragm to the film plane does not change and the first lens group is moved away from the diaphragm as in the embodiment of the present invention, the effective diameter of the first movable lens goup is required to be large enough to unchange the effective F-number even when closing up. In general, however, the demand for compactness of the lens and like reasons often lead to the impossibility of imparting a sufficiently large effective diameter into the first movable lens group. Although the focusing method of the present invention is less susceptible to that factor because the amount of movement of the first lens group is smaller than when the conventional focusing method of making movable the front member only is employed, as the maximum possible image magnification fication is increased, the additional amount of movement becomes impossible to ignore. As schematically shown in FIG. 17 and particularly FIG. 18, the effective diameter of the first movable lens group regulates the on-axial maximum pencil so that the effective pencil at the diaphragm plane is smaller than the maximum diameter of the aperture. Therefore, a zone is created where the brightness remains unchanged despite the closing down of the diaphragm from the full aperture, and photographic situations where an inaccurate exposure control is resulted may be encountered. FIG. 17 shows the tracing of a ray of light which is admitted by the full aperture of the diaphragm when the lens system is focused at infinity. FIG. 18 shows the tracing of rays which are admitted by the effective diameter of the first movable lens group when focusing is effected down to a shorter object distance. If the diameter of the first movable lens group is so large that the actually admitted pencil passes along a dashed line, the F-number is not subject to change. When the first lens group is moved to the front, the effect is substantially the same as if the first lens group were edged down to so small a diameter that, as the oblique pencils which the diaphragm allows to pass at points between the dashed and solid lines of FIG. 18 define the limit of the field of view, the closing down of the diaphragm is no longer effective to adjust the brightness due to the on-axial pencil.

To avoid this, it is proposed to provide a mechanism M for adjusting the diameter of the full aperture in response to the focusing ring R. With such mechanism, when focusing is performed, the diaphragm is automatically closed down to a diameter coincident with that of the effective pencil at the position of the diaphragm, thus preventing inconsistency between the actual aperture and the effective pencil when it nears the full one. It is noted that the diaphragm can be closed down to a desired F-number without the recourse to the mechanism M.

The provision of the above-described feature gives rise to an advantage that the compactness is facilitated by the reduction of the diameter of the first movable lens group. Another advantage is that the off-axial pencil can be taken off in portions to improve the picture taking quality.

To further facilitate the improvement of the picture taking quality, besides the diaphragm of regulating the F-number, use may be made of a second diaphragm arranged to be axially movable with focusing in such a manner that when the second lens group is moved to the front, this diaphragm is also moved to the front.

Taking one numerical example, the advantage of the present invention is clarified below. Letting f1, f2 and f3 denote the focal lengths of the first and second movable lens groups and the stationary lens group respectively, and e1 and e2 the intervals between the principal points of the first and second movable lens groups and between those of the movable second and stationary third lens groups, a telephoto objective in question is characterized by:

| | |
|---|---|
| f1 = 119.33316 | e1 = 42.8 |
| f2 = −86.45656 | e2 = 55.5 |
| f3 = 143.29756 | |

We now set forth four different examples of ways in which the objective is focused down to shorter object distances as by (1) moving the first and the second lens groups I and II in opposite direction to each other, (2) bodily moving the entire lens system, (3) moving only the first lens group I to the front, and (4) moving only the second lens group II to the rear. For each of these ways, the focal length, f, object distance, $g_1$, and image magnification, $\beta$, have been evaluated in terms of the amount of movement, d, which are taken at two discrete values, and the results are listed in the following table.

| d | | 1 | 2 | 3 | 4 |
|---|---|---|---|---|---|
| 10 mm | f | 189.2 | 197.4 | 197.1 | 192.0 |
| | $g_1$ | −885.3 | −4095.6 | −1618.6 | −1614.3 |
| | $\beta$ | −0.272 | −0.051 | −0.139 | −0.135 |
| 20 mm | f | 173.1 | 197.4 | 196.7 | 182.2 |

-continued

| d | 1 | 2 | 3 | 4 |
|---|---|---|---|---|
| $g_1$ | −496.0 | −2146.5 | −906.2 | −866.6 |
| $\beta$ | −0.536 | −0.101 | −0.277 | −0.266 |

It will be seen from the table that the amount of movement of the focusing lens necessary to effect production of an equivalent image magnification is far smaller in the present invention. Further, the amount of -continued Focal length f = 100  Image angle 2ω = 12.35°
F-number = 1:4.0  Magnification β = 0.~ −1.0X

| | R | D | νd | Nd |
|---|---|---|---|---|
| 14 | 53.848 | 2.024 | 55.50 | 1.69680 |
| 15 | −73.034 | | | |

Close-up D7 = 43.7838
D12 = 4.7219

Aberration Coefficient of 3rd Order

| Surface No. | L | T | SA | CM | AS | PT | DS |
|---|---|---|---|---|---|---|---|
| 1 | 0.01187 | −0.00530 | 1.98373 | −0.88630 | 0.39599 | 0.68179 | −0.48154 |
| 2 | 0.00674 | −0.01181 | 0.88512 | −1.54991 | 2.71399 | 0.04387 | −4.82920 |
| 3 | 0.02681 | −0.00635 | −0.16486 | 0.03906 | −0.00925 | 1.10121 | −0.25876 |
| 4 | −0.04987 | 0.03225 | −1.81104 | 1.17126 | −0.75749 | −0.37936 | 0.73524 |
| 5 | 0.00590 | −0.01072 | 1.01704 | −1.84648 | 3.35234 | −0.20606 | −5.71216 |
| 6 | 0.03115 | −0.01051 | −0.40857 | 0.13784 | −0.04650 | 2.30745 | −0.76278 |
| 7 | −0.03082 | 0.00964 | −0.03505 | 0.01096 | −0.00343 | −2.54430 | 0.79731 |
| 8 | −0.00974 | 0.01224 | −4.88417 | 6.13861 | −7.71522 | −0.45270 | 10.26575 |
| 9 | −0.00250 | −0.00407 | 0.01384 | 0.02254 | 0.03670 | −0.63638 | −0.97653 |
| 10 | −0.01069 | 0.02222 | −0.38624 | 0.80271 | −1.66823 | −0.32963 | 4.15205 |
| 11 | 0.02234 | −0.02304 | 2.45610 | −2.53319 | 2.61270 | 0.35605 | −3.06194 |
| 12 | −0.00400 | −0.00343 | −0.13908 | −0.11922 | −0.10220 | −0.67096 | −0.66277 |
| 13 | 0.00361 | 0.02347 | −0.00088 | −0.00576 | −0.03746 | 0.34889 | 2.02213 |
| 14 | −0.01142 | −0.01512 | −0.02034 | −0.02694 | −0.03568 | −0.06570 | −0.13427 |
| 15 | 0.00950 | −0.00792 | 1.57015 | −1.30901 | 1.09130 | 0.56227 | −1.37856 |
| Total | −0.00110 | 0.00152 | 0.07574 | 0.04615 | −0.17245 | 0.11646 | −0.28605 |

L: Longitudinal Chromatic Aberration
T: Transverse Chromatic Aberration
SA: Spherical Aberration
CM: Coma
AS: Astigmatism
PT: Petzval Sum
DS: Distortion variation of the focal length with the production of an equivalent image magnification when in the focusing method (1) takes an intermediate value between those when in the methods (3) and (4). That is, according to the present invention, an elongation of the focal length and an increase of the image magnification can be achieved by a decreased amount of movement, and the shift of the center of gravity during focusing is made smaller next to the method of moving the second lens group to the rear.

Three examples of specific telephoto objectives may be constructed in accordance with the numerical data given below for the radii of curvature, R, the axial thicknesses and separations, D, along with the Abbe numbers, νd, and the indices of refraction, Nd, for the various lens elements. The focal length is normalized to 100 mm.

EXAMPLE 1

Focal length f = 100  Image angle 2ω = 12.35°
F-number = 1:4.0  Magnification β = 0.~ −1.0X

| | R | D | νd | Nd |
|---|---|---|---|---|
| 1 | 48.068 | 3.290 | 70.10 | 1.48749 |
| 2 | −746.918 | 0.101 | | 1. |
| 3 | 37.358 | 2.024 | 30.10 | 1.69895 |
| 4 | 22.056 | 5.062 | 70.10 | 1.48749 |
| 5 | 159.043 | 3.821 | | 1. |
| 6 | 18.191 | 2.024 | 38.00 | 1.72342 |
| 7 | 16.497 | D7 | | 1. |
| 8 | −72.392 | 1.265 | 70.10 | 1.48749 |
| 9 | 51.498 | 1.648 | | 1. |
| 10 | −137.953 | 2.024 | 37.20 | 1.83400 |
| 11 | −35.673 | 1.012 | 70.10 | 1.48749 |
| 12 | 48.844 | D12 | | 1. |
| 13 | 127.841 | 1.265 | 25.40 | 1.80518 |

EXAMPLE 2 f = 100  F/4.0  2ω = 12.35°  β = 0.~ −0.5X

| | R | D | νd | Nd |
|---|---|---|---|---|
| 1 | 75.061 | 4.000 | 63.40 | 1.61800 |
| 2 | −59.869 | 2.054 | | 1. |
| 3 | −50.082 | 1.400 | 26.60 | 1.76182 |
| 4 | −285.675 | 0.250 | | 1. |
| 5 | 68.510 | 3.000 | 63.40 | 1.61800 |
| 6 | −185.718 | D6 | | 1. |
| 7 | −52.534 | 1.250 | 66.10 | 1.49388 |
| 8 | 51.928 | 1.868 | | 1. |
| 9 | −69.542 | 2.250 | 25.40 | 1.80518 |
| 10 | −23.953 | 1.250 | 60.70 | 1.60311 |
| 11 | 60.351 | D11 | | 1. |
| 12 | 184.454 | 1.250 | 25.40 | 1.80518 |
| 13 | 31.489 | 5.000 | 49.60 | 1.77250 |
| 14 | −49.163 | | | |

Close-up D6 = 23.4562
D11 = 8.0482

EXAMPLE 3 f = 100  F/4.0  2ω = 12.35°  β = 0.~ −0.5X

| | R | D | νd | Nd |
|---|---|---|---|---|
| 1 | 49.178 | 3.500 | 53.90 | 1.71300 |
| 2 | −3447.931 | 0.100 | | 1. |
| 3 | 37.103 | 4.250 | 53.90 | 1.71300 |
| 4 | −526.460 | 0.382 | | 1. |
| 5 | −321.772 | 1.500 | 26.60 | 1.76182 |
| 6 | 49.104 | 4.269 | | 1. |
| 7 | 19.552 | 2.000 | 35.80 | 1.66446 |
| 8 | 16.425 | D8 | | 1. |
| 9 | −103.727 | 2.250 | 38.00 | 1.72342 |
| 10 | −22.829 | 1.064 | 60.70 | 1.60311 |
| 11 | 208.160 | 5.419 | | 1. |

-continued

| | f = 100 F/4.0 R | 2ω = 12.35° D | β = 0.~-0.5X νd | Nd |
|---|---|---|---|---|
| 12 | −1590.663 | 1.333 | 42.80 | 1.56732 |
| 13 | 29.947 | D13 | | 1. |
| 14 | −17.951 | 1.250 | 28.50 | 1.72825 |
| 15 | −21.581 | 2.500 | | 1. |
| 16 | 66.671 | 3.250 | 53.90 | 1.71300 |
| 17 | −61.480 | | | |

Close-up D8 = 19.1026
D13 = 13.2308

What is claimed is:

1. A telephoto objective comprising:
a first axially movable lens group having a positive refractive power;
a second axially movable lens group positioned on the image side of said movable first lens group and having a negative refractive power; and
a fixed lens group positioned on the image side of said movable second lens group and having a positive refractive power;
said first and said second movable lens groups being arranged to be moved simultaneously in opposite axial directions to focus the telephoto objective on an object and when focused at an infinite distance the distance between the first axially movable lens group and the second axially movable lens group being smaller than the distance between the second axially movable lens group and the fixed lens group.

2. A telephoto objective as in claim 1 in that the relationship $$0.7 < |S_1|/|S_2| < 1.4$$

is satisfied, wherein $S_1$ and $S_2$ are the amounts of movement of said first and second lens group respectively when focusing.

3. A telephoto objective as in claim 1, further including:
a first focusing path for moving said first movable lens group and controlling the amount of movement thereof;
a second focusing path for moving said second movable lens group and controlling the amount of movement thereof; and
drive means for driving said first and said second focusing paths so as to cause the paths to move said first and second movable lens groups;
at least one of said first and said second focusing paths being configured so that the amount of movement of the movable lens group varies as said drive means moves a given amount.

4. A telephoto objective as described in claim 3, wherein each of said first and said second focusing paths is a bent-on-the-way linear focusing groove.

5. A telephoto objective as in claim 1, wherein the objective has a front for facing an object and a rear for facing an image and a plurality of lens elements, and said movable first lens group has a single negative meniscus lens convex toward the front and located separately after at least two lens elements from the front.

6. A telephoto objective according to claim 1, in which the first axially movable lens comprises at least two positive lens elements and one negative lens element as well as a rearmost meniscus lens element with a convex surface directed toward the object.

7. A telephoto objective according to claim 6, in which the meniscus lens element has a weak negative refractive power.

8. A telephoto objective according to claim 6, which when focused at an infinite distance the distance between the first axially movable lens group and the second axially movable lens group is larger than the distance between the meniscus lens element and other lens elements in the first axially movable lens group.

9. A telephoto objective comprising:
a first axially movable lens group having a positive refractive power;
a second axially movable lens group positioned on the image side of said movable first lens group and having a negative refractive power; and
a fixed lens group positioned on the image side of said movable second lens group and having a positive refractive power;
said first and said second movable lens group being arranged to be moved simultaneously in opposite axial directions to focus the telephoto objective on an object and when focused at an infinite distance the distance between the first axially movable lens group and the second axially movable lens group being smaller than the distance between the second axially movable lens group and the fixed lens group;
control means for driving each of said first and said second movable lens group to move said first and second movable lens groups and for controlling the amount of movement thereof; and
a diaphram positioned in a space between said movable second and said fixed lens groups and cooperative with said control means to limit light rays passing therethrough in response to focusing.

10. A telephoto objective comprising:
a first axially movable lens group having a positive refractive power;
a second axially movable lens group positioned on the image side of said movable first lens group and having a negative refractive power; and
a fixed lens group postioned on the image side of said movable second lens group and having a positive refractive power;
said first and said second movable lens group being arranged to be moved simultaneously in opposite axial directions to focus the telephoto objective on the object;
the relationship $0.7 < |S_1|/|S_2| < 1.4$ being satisfied, where $S_1$ and $S_2$ are the amounts of movement of said first and said second lens groups respectively when focusing for photography with a magnification ratio not less than 0.5.

11. A telephoto objective comprising:
a movable first lens group axially movable for focusing and having a positive refractive power;
a movable second lens group on the image side of said first lens group, axially movable for focusing the objective, and having a negative refractive power; and
a fixed lens group on the image side of said second lens group and having a positive refractive power, and satisfying the following data:

Focal Length f = 100  Image Angle 2ω = 12.35°
F-number = 1:4.0  Magnification β = 0.~−1.0X
    Axial    Abbe -continued

| | Radii of Curvature R | Thicknesses & Separation D | Numbers νd | Indices of Refraction Nd |
|---|---|---|---|---|
| 1 | 48.068 | 3.290 | 70.10 | 1.48749 |
| 2 | −746.918 | 0.101 | | 1. |
| 3 | 37.358 | 2.024 | 30.10 | 1.69895 |
| 4 | 22.056 | 5.062 | 70.10 | 1.48749 |
| 5 | 159.043 | 3.821 | | 1. |
| 6 | 18.191 | 2.024 | 38.00 | 1.72342 |
| 7 | 16.497 | D7 | | 1. |
| 8 | −72.392 | 1.265 | 70.10 | 1.48749 |
| 9 | 51.498 | 1.648 | | 1. |
| 10 | −137.953 | 2.024 | 37.20 | 1.83400 |
| 11 | −35.673 | 1.012 | 70.10 | 1.48749 |
| 12 | 48.844 | D12 | | 1. |
| 13 | 127.841 | 1.265 | 25.40 | 1.80518 |
| 14 | 53.848 | 2.024 | 55.50 | 1.69680 |
| 15 | −73.034 | | | |

| | Infinity | Close-up |
|---|---|---|
| D7 | 5.208 | 43.7838 |
| D12 | 24.009 | 4.7219 |

12. A telephoto objective comprising:
a movable first lens group axially movable for focusing of the objective and having a positive refractive power;
a movable second lens group on the image side of said first lens group, axially movable for focusing the objective, and having a negative refractive power; and
a fixed lens group on the image side of said second lens group and having a positive refractive power, and satisfying the following data:

Focal Length f = 100 Image Angle 2ω = 12.35° F-number = 1:4.0
Magnification β = 0. ~ −0.5X

| | Radii of Curvature R | Axial Thicknesses and Separation D | Abbe Numbers νd | Indices of Refraction Nd |
|---|---|---|---|---|
| 1 | 75.061 | 4.000 | 63.40 | 1.61800 |
| 2 | −59.869 | 2.054 | | 1. |
| 3 | −50.082 | 1.400 | 26.60 | 1.76182 |
| 4 | −285.675 | 0.250 | | 1. |
| 5 | 68.510 | 3.000 | 63.40 | 1.61800 |
| 6 | −185.718 | D6 | | 1. |
| 7 | −52.534 | 1.250 | 66.10 | 1.49388 |
| 8 | 51.928 | 1.868 | | 1. |
| 9 | −69.542 | 2.250 | 25.40 | 1.80518 |

-continued

| 10 | −23.953 | 1.250 | 60.70 | 1.60311 |
|---|---|---|---|---|
| 11 | 60.351 | D11 | | 1. |
| 12 | 184.454 | 1.250 | 25.40 | 1.80518 |
| 13 | 31.489 | 5.000 | 49.60 | 1.77250 |
| 14 | −49.163 | | | |

| | Infinity | Close-up |
|---|---|---|
| D6 | 8.338 | 23.4562 |
| D11 | 14.095 | 8.0482 |

13. A telephoto objective comprising:
a movable first lens group axially movable for focusing the objective and having a positive refractive power;
a movable second lens group on the image side of said first lens group, axially movable for focusing the objective and having a negative refractive power; and
a fixed lens group on the image side of said second lens group, and a positive refractive power, and satisfying the following data:

Focal Length f = 100 Image Angle 2ω = 12.35° F-number = 1:4.0
Magnification β = 0. ~ −0.5X

| | Radii of Curvature R | Axial Thicknesses and Separations D | Abbe Numbers νd | Indices of Refraction Nd |
|---|---|---|---|---|
| 1 | 49.178 | 3.500 | 53.90 | 1.71300 |
| 2 | −3447.931 | 0.100 | | 1. |
| 3 | 37.103 | 4.250 | 53.90 | 1.71300 |
| 4 | −526.460 | 0.382 | | 1. |
| 5 | −321.772 | 1.500 | 26.60 | 1.76182 |
| 6 | 49.104 | 4.269 | | 1. |
| 7 | 19.552 | 2.000 | 35.80 | 1.66446 |
| 8 | 16.425 | D8 | | 1. |
| 9 | −103.727 | 2.250 | 38.00 | 1.72342 |
| 10 | −22.829 | 1.064 | 60.70 | 1.60311 |
| 11 | 208.160 | 5.419 | | 1. |
| 12 | −1590.663 | 1.333 | 42.80 | 1.56732 |
| 13 | 29.947 | D13 | | 1. |
| 14 | −17.951 | 1.250 | 28.50 | 1.72825 |
| 15 | −21.581 | 2.500 | | 1. |
| 16 | 66.671 | 3.250 | 53.90 | 1.71300 |
| 17 | −61.480 | | | |

| | Infinity | Close-up |
|---|---|---|
| D8 | 11.051 | 19.1026 |
| D13 | 24.230 | 13.2308 |

* * * * *